United States Patent [19]

Thompson et al.

[11] Patent Number: 5,581,483
[45] Date of Patent: Dec. 3, 1996

[54] MEASUREMENT OF SHOT PEENING COVERAGE BY CORRELATION ANALYSIS OF SURFACE LINE DATA

[75] Inventors: Robert A. Thompson, New York, N.Y.; Mark A. Tascillo, Canton, Mich.; Victor A. Skormin, Birkshire, N.Y.

[73] Assignee: General Electric Company, Schenectady, N.Y.

[21] Appl. No.: 308,782

[22] Filed: Sep. 19, 1994

[51] Int. Cl.⁶ .................................................. G06F 17/15
[52] U.S. Cl. ............. 364/554; 364/474.01; 364/474.03; 364/552
[58] Field of Search ................................ 364/554, 473, 364/148, 474.01–474.03, 552, 472, 149, 507, 508, 560; 73/104, 105, 11.02, 823, 844; 118/663, 664, 668, 669, 670; 29/90.7, 90.1, 894, 325; 72/53; 451/38, 465, 534, 2, 80, 75, 60, 5, 39, 55; 428/611, 653, 75, 60, 5, 39, 55, 938

[56] References Cited

U.S. PATENT DOCUMENTS

| | | | |
|---|---|---|---|
| 4,614,100 | 9/1986 | Green et al. | 72/53 |
| 5,166,885 | 11/1992 | Thompson | 364/473 |
| 5,204,826 | 4/1993 | Thompson et al. | 364/552 |
| 5,235,517 | 8/1993 | Thompson et al. | 364/473 |
| 5,293,320 | 3/1994 | Thompson et al. | 364/474.02 |

*Primary Examiner*—Emanuel T. Voeltz
*Assistant Examiner*—Hal D. Wachsman
*Attorney, Agent, or Firm*—Paul R. Webb, II

[57] ABSTRACT

A method of measuring shot peening coverage includes correlation analysis of surface line data. The method comprises the use of cross correlation of two or more parallel profile traces of a shot peened surface to produce a numeric indication of relative part coverage.

12 Claims, 8 Drawing Sheets

MEASUREMENT OF SHOT PEENING COVERAGE BY CORRELATION ANALYSIS OF SURFACE LINE DATA

BACKGROUND OF THE INVENTION

This invention relates to a novel method of measuring shot peening coverage by using correlation analysis of surface line data. More particularly, said method comprises the use of cross correlation of two or more parallel profile traces of a shot peened surface to produce a numeric indication of relative part coverage with a minimum of computational delay.

During a shot peening process, a stream of shot traveling at a high velocity is directed at a workpiece surface. The shot is directed at the workpiece so as to cause plastic deformation of the workpiece surface, which often is a metal surface. Although the process may be applied for other purposes, the shot peening process generally is used to increase fatigue strength of the workpiece.

In a shot peening process, the ability to attain accurate coverage levels is important to the quality of the finished product. This is especially true for contoured or repeened surfaces where it is difficult to predict the exact coverage or know the coverage history.

Under normal shot peening conditions, it is desirable to expose the substrate or work surface to the shot stream for a sufficient time to achieve 100% surface coverage, or sufficient exposure to fully cover the surface with impact dimples. Insufficient coverage has obvious adverse consequences. If the local compressive zones, due to individual shot strikes, do not merge into a continuum that fully covers the surface with a compressive layer, locally unprotected regions will exist which may cause some regions of the surface to remain in tension and become crack initiation sights. In addition, too much coverage will overharden the surface, making it become brittle and susceptible to cracking.

To date various coverage analysis techniques exist. Several of these techniques are disclosed in U.S. Pat. No. 5,235,517 and U.S. Pat. No. 5,293,320, both being invented by R. A. Thompson and Mark A. Tascillo, inventors of the instant invention. Each of the before mentioned patents have been assigned to the same assignee as the present invention.

The techniques disclosed in U.S. Pat. No. 5,235,517, "Measurement of Shot Peening Coverage by Automated Analysis of Peened Surface Line Traces," rely on the detection of increasing surface hardness as surface exposure time to the shot stream increases. This approach works well with multiple single data traces and shows good response where periodic machining information has been removed from the part by the peening process. The hardness algorithm is efficient but suffers from a somewhat diminished signal to noise ratio due in part to taking derivatives of the data.

The approach taken in U.S. Pat. No. 5,293,320, "Measurement of Shot Peening Coverage by Impact Dent Characterization," computes a contour map of the surface from a high resolution 3-D surface scan. The contour map is then processed to resolve the individual shot strikes and totals them. This approach maintains good resolution of coverage up to 400%, after which the additional peening effects are no longer resolved. This analysis has proved the most accurate to date but is numerically intensive and requires considerable processing time. Furthermore, the on-line use of this algorithm requires high resolution, multi-trace 3-D surface scans. Such a process is practical for smaller items but becomes more difficult for larger, more ungainly objects.

An ideal coverage analysis for use on a factory floor should work from line data and require the accumulation of only a few line traces. In addition, the computation time should be minimal.

It is apparent from the above that there exists a need in the art for a quick, inexpensive, and accurate method of measuring shot peening coverage. It is a purpose of this invention to fulfill this and other needs in the art in a manner more apparent to the skilled artisan once given the following disclosure.

SUMMARY OF THE INVENTION

The above-mentioned needs are met by the present invention which relates to a novel method of measuring shot peening coverage using analysis of surface line traces recorded by a profilometer. More particularly, said method comprises: the selection of an area on a peened workpiece to be analyzed; taking a series of parallel profile line traces across this selected area; determining if the parallel profile line traces have proper spacing; determining the correlation function for the line traces; and generating a numerical expression of the relative part coverage by finding the maximum peak to peak value of the correlation.

The preferred measurement system, according to this invention, offers the following advantages: ease of use; excellent measurement characteristics; good stability; reduced computational time; and good economy. In fact, in many of the preferred embodiments, these factors of ease of use, reduced computational time, and improved measurement are optimized to an extent considerably higher than heretofore achieved in prior, known shot peening coverage systems.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
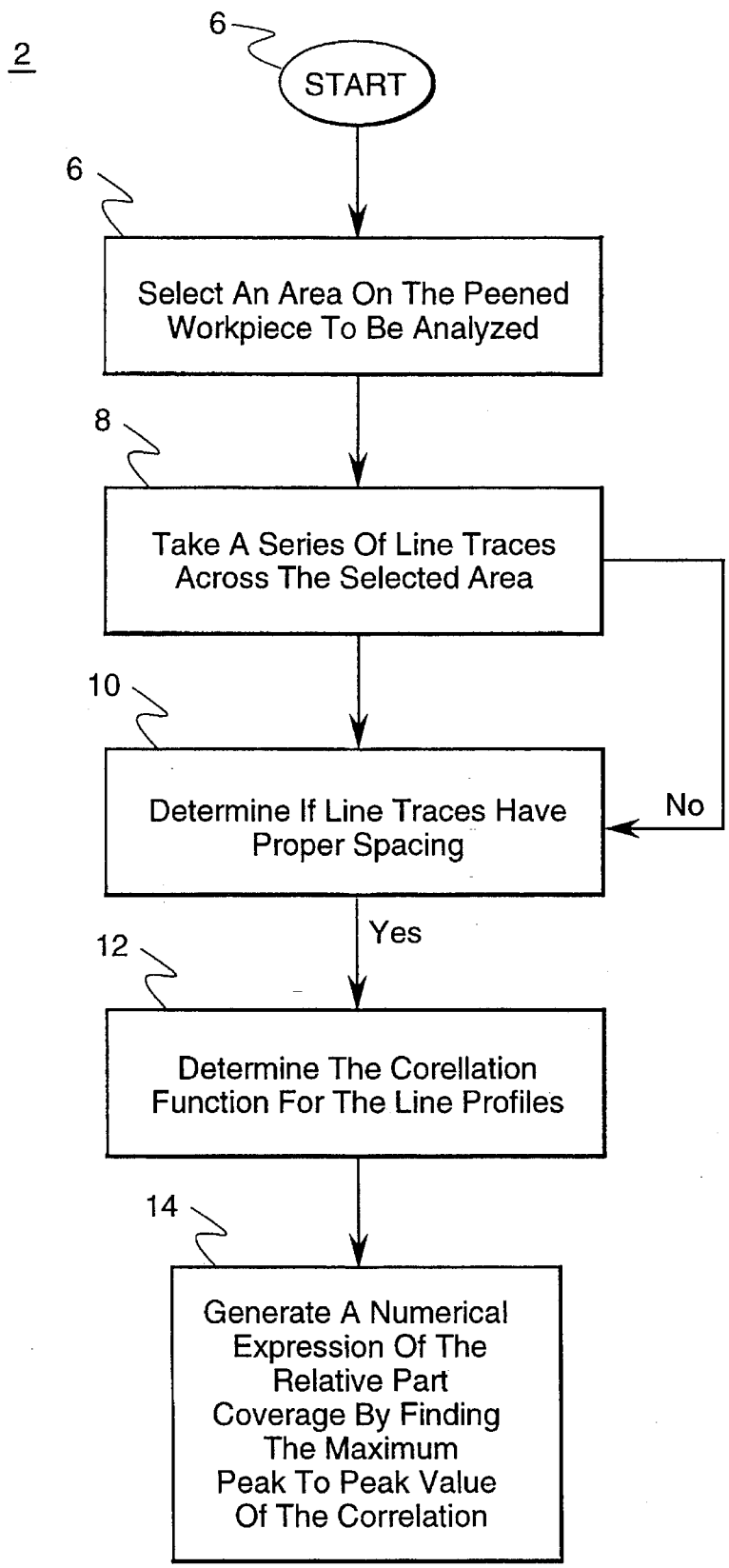
FIG. 1 is a flowchart illustrating a sequence of method steps in accordance with the instant invention.

The basic premise involved in the instant invention is that the correlation function has a large absolute value when regular surface features such as machining marks exist, but grows smaller as shot peening hammers down the regularities, replacing them with a random profile. The correlation function of a fully random surface is zero. The instant invention uses this known relationship as the crux of its novel method for measuring coverage.

The concept of coverage involves a statistical element. If N precisely aimed shot particles and their associated dimple areas are required to fully cover a certain part area, the statistical nature of shot peening requires that 4.6N strikes of randomly directed particles from a peening gun are needed to cover 99% of the same area. In fact, in the case of truly random particles, an infinite number of strikes would be needed to achieve 100% coverage. There is therefore a need to define a practical measure for full coverage. This has been accomplished using a measurement called saturation.

Since saturation is the basis for peening time in the instant invention, it is important to understand the significance of saturation. Saturation is defined by the bending of a standard Almen strip, a strip used traditionally to measure peening intensity. The peening time to achieve full coverage (nominally 100%) at a given air pressure and shot size is defined as the exposure time required for an Almen strip to reach saturation, or the level of coverage at which doubling the peening time will cause no more than a 10% increase in the measured deflection of the Almen strip. Coverage levels above and below this defined level are described as multiples of the 100% coverage time. For example, if in a particular process 100% coverage, or saturation, was reached in 10 minutes, 20 minutes of peening under the same conditions would lead to 200% coverage.

Currently, the region of most interest is the range between 100% and 400% coverage, as this is the range of effective compressive layer generation without overhardening the surface.

In order to properly understand the instant invention, the theory of the correlation technique must be further explained. The cross correlation technique provides an indication of the relative closeness between two sets of data as a function of the distance between individual points in the sets. The cross correlation formula for two data vectors of N points each, labeled $x_1$ and $x_2$ respectively is given in equation (1) as:

$$R_{xy}^j = \frac{1}{\alpha_1 \alpha_2 (N-j)} \sum_{i=1}^{N-j} [(x_{1-\eta_1}^i)(x_{2-\eta_2}^{i+j-1})] \quad (1)$$

where j ranges from 0 to N/3.

The standard deviation represented by $\alpha_1$ and $\alpha_2$ are given in equations (2) and (3), and the mean values $\eta_1$ and $\eta_2$ are given in equations (4) and (5).

$$\alpha_1 = \frac{1}{N} \sqrt{\sum_{i=1}^{N} (x_1 - \eta_1)^2} \quad (2)$$

$$\alpha_2 = \frac{1}{N} \sqrt{\sum_{i=1}^{N} (x_2 - \eta_2)^2} \quad (3)$$

$$\eta_1 = \frac{1}{N} \sum_{i=1}^{N} x_1 \quad (4)$$

$$\eta_2 = \frac{1}{N} \sum_{i=1}^{N} x_2 \quad (5)$$

Equation (1) is normalized to a range between positive and negative one with a value of +1 representing full correlation and a value of −1 representing a negative correlation from two otherwise identical wave forms being exactly 180 degrees out of phase. Responses near zero indicate that the data is essentially random in nature and that the samples are unrelated.

In the process of generating a compressive layer, shot peening reconfigures the surface profile of a sample. Machining and other information on the surface is gradually eliminated by continued peening. On low Almen intensity samples (7A) the machining information is visible to the eye for coverage levels of 100% through 800%. The same may be said for a similar set of samples 12A intensity, both sets being shot peened with steel shot of 1 mm diameter.

Although the effect of increased peening time is obvious to the naked eye, any coverage estimate is highly subjective and would differ from one inspector to another. The correlation technique disclosed within solves this problem by quantifying coverage.

To determine the shot peening coverage, in accordance with the instant invention, after a workpiece has been peened, a system user initiates the process which is briefly illustrated as a flow diagram 2 in FIG. 1. The system user may for example, be a human or, a computer including a computer-controlled unit.

Specifically referring to flow diagram 2, after the process has been initiated as indicated at start block 4, the system user selects an area on the peened workpiece to be analyzed 6. The user then takes a plurality, usually two, of line traces/profiles across the selected area 8. This process may be carried out by using a profilometer, preferably a stylus 4000 profilometer. The vertical displacement of a probe stylus is translated to electrical signals through an inductive pickup in the probe of the profilometer. This signal may then be amplified and converted to an ASCII form for analysis in a graphics software system.

The line traces should preferably be reasonably parallel to one another and should be taken across the selected area at a 30° angle with respect to the resident machining information. In many cases the shot peening information, i.e. dimple diameter, occurs at spacing similar to the lead of the machining marks, therefore, the best results may be obtained by profiling the sample at 30° with respect to the machining information. This reduces the apparent frequency of the machining information with respect to that of the shot peening while still observing at least two machining marks per profile scan.

Next, the user must determine whether the lines traces have a spacing between them of no less than twice the diameter of the largest shot crater expected on the surface 10. This size may be estimated with sufficient accuracy from the measured Almen intensity of the sample in question as it is known that the Almen number roughly equals the diameter of the shot dimples in mils (thousandths of an inch).

Finally, the user determines the correlation function for the two line traces using equation (1). To simplify the complex calculations involved, said correlation function may be solved using computer codes. From the results of equation (1), the user may then generate a numerical expression, indicative of the relative part coverage, by finding the maximum peak to peak value of the correlation 14.

Figure 2:
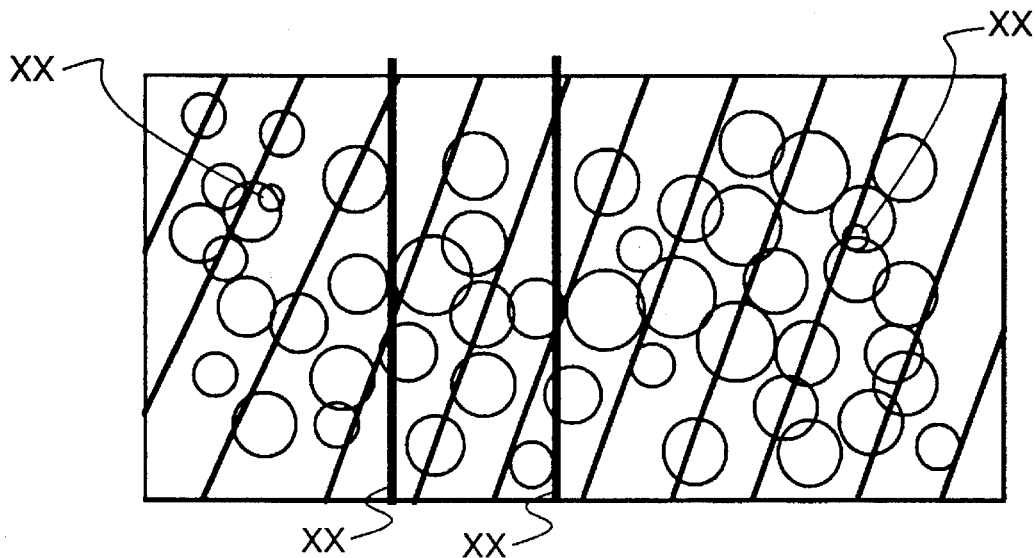
FIG. 2 is a frontal view of a typical shot peened sample with machining information and profile traces capable of performing a coverage measurement in accordance with the instant invention.

FIG. 2 shows a typical shot peened sample with machining information and the parallel profile line traces as they are taken to perform a coverage measurement.

As some phase difference between the machining marks of the two samples is expected, negative values of the correlation are just as important as positive values, making the overall peak to peak magnitude the most meaningful interpretation of the data in a single quantity.

Example

A set of shot peened samples representing three intensity ranges at various coverage levels were analyzed. The intensity/coverage breakdown of the samples is as follows:

| Almen intensity (A) | Coverage level | Number of samples |
| --- | --- | --- |
| 6–7 | 100% | 2 |
| 6–7 | 400% | 2 |
| 6–7 | 800% | 2 |
| 11–13 | 100% | 2 |
| 11–13 | 400% | 2 |
| 11–13 | 800% | 2 |
| 15–18 | 5% | 1 |
| 15–18 | 10% | 1 |
| 15–18 | 20% | 1 |
| 15–18 | 40% | 1 |
| 15–18 | 100% | 1 |
| 15–18 | 400% | 1 |
| 15–18 | 800% | 2 |

A pair of profile traces were taken at 30 degrees with respect to the machining marks of each of these samples in accordance with the instant invention. Each of these traces was 0.2 inches in length, just long enough to sufficiently sample 1 to 2 machining marks.

Within this 0.2 inch trace, 800 data points were taken equating to a sampling frequency of 4000 cycles per inch which equates to one sample taken every 0.25 mils or every 250 micro inches.

Figure 3:
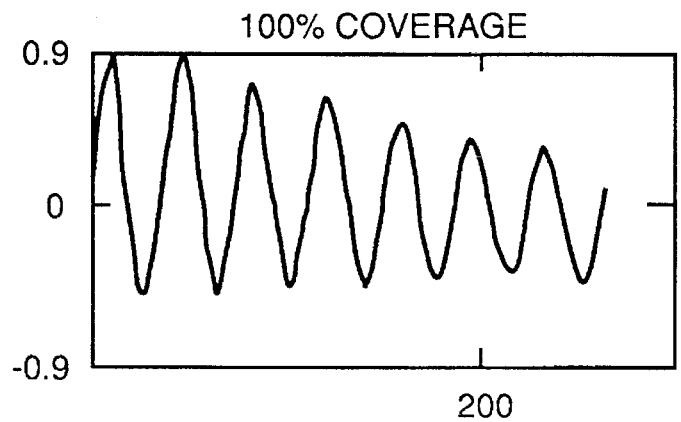
FIG. 3 is a series of correlation plots for a low intensity shot peened sampling, said sampling ranging from an Almen Intensity of 6.0 to 7.2.
Figure 3:
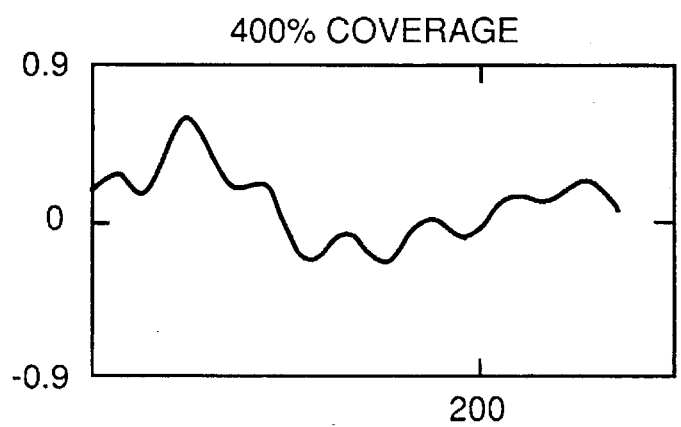
Figure 3:
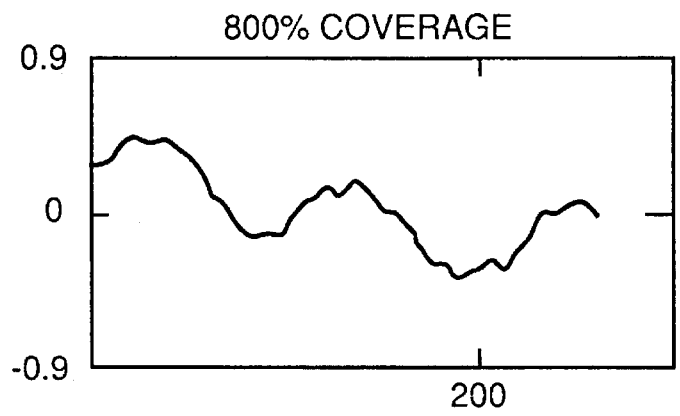
Figure 4:
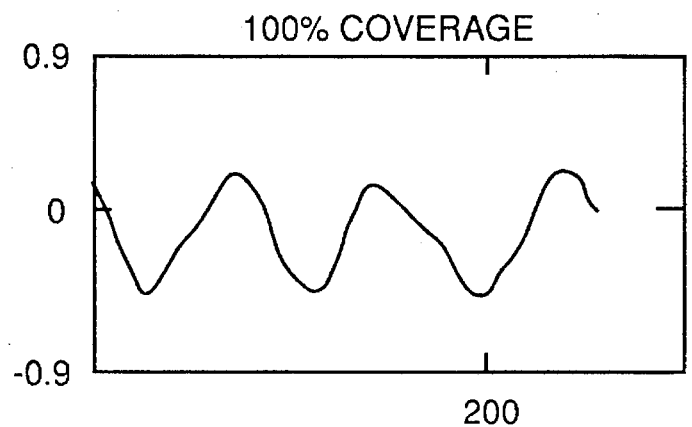
FIG. 4 is a series of correlation plots for a medium intensity shot peened sampling, said sampling ranging from an Almen Intensity of 11.0 to 13.0.
Figure 4:
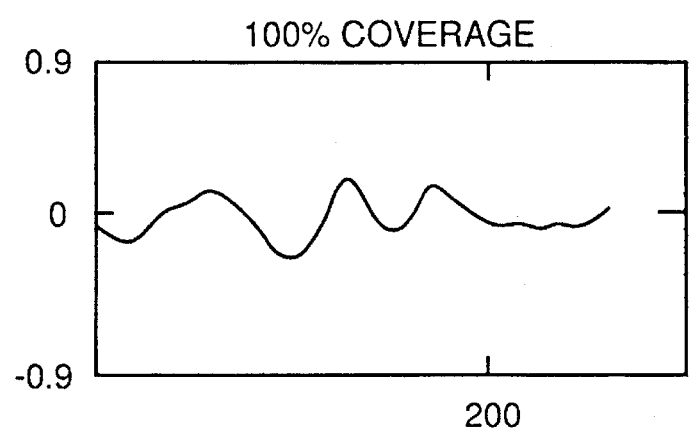
Figure 4:
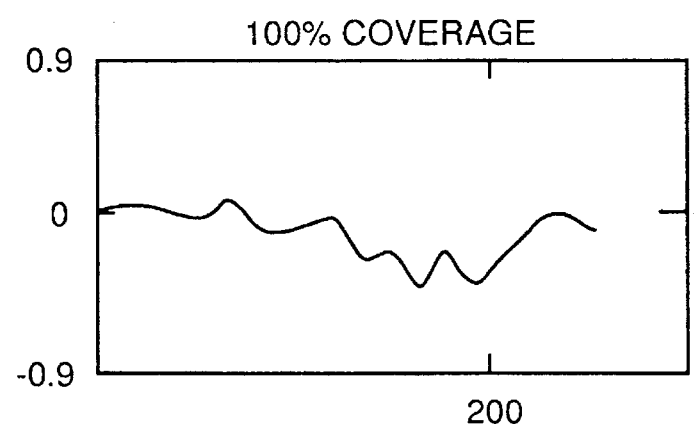
Figure 5:
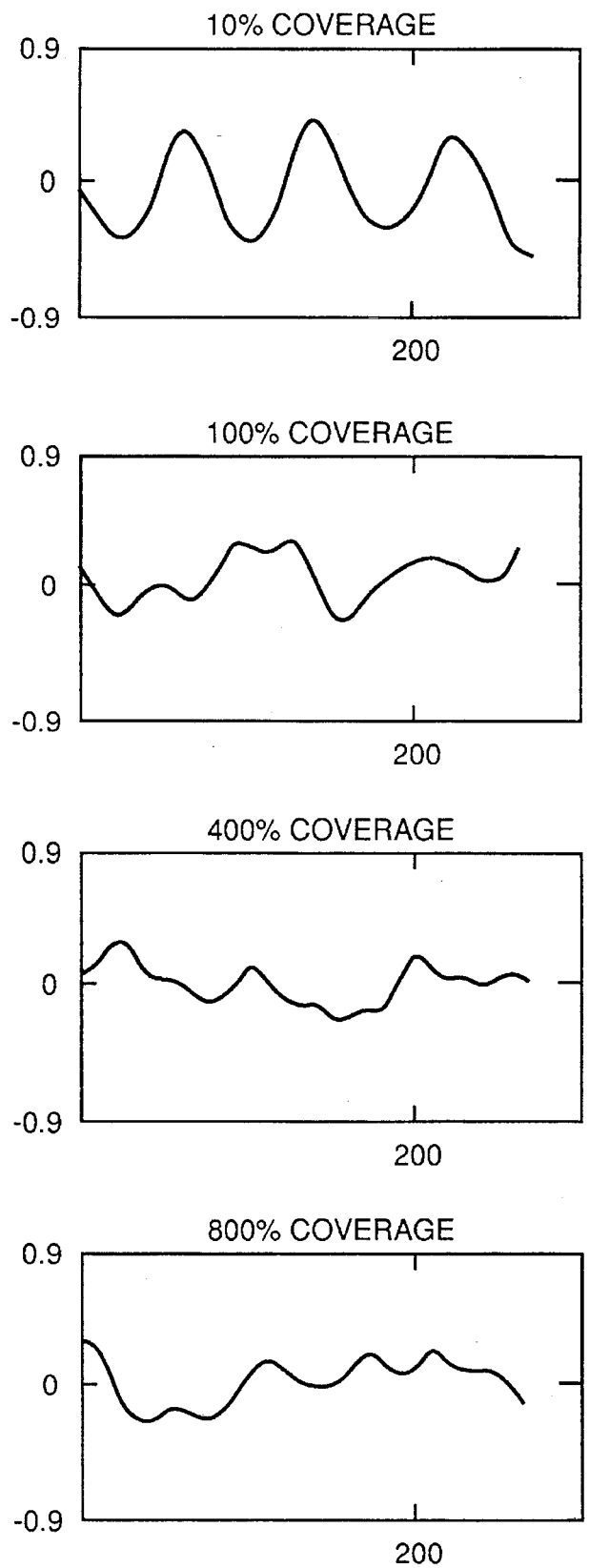
FIG. 5 is a series of correlation plots for a high intensity shot peened sampling, said sampling ranging from an Almen Intensity of 15.0 to 18.0.

Spacing between the two traces was set at 20 mils for the lowest intensity data and increased to 40 mils for the remaining samples to assure significant variation between the two traces. The correlation functions of each set of traces were then calculated from equation (1) as implemented in a computer software code. Correlation plots for each intensity range, are shown in FIGS. 3, 4, and 5.

Figure 6:
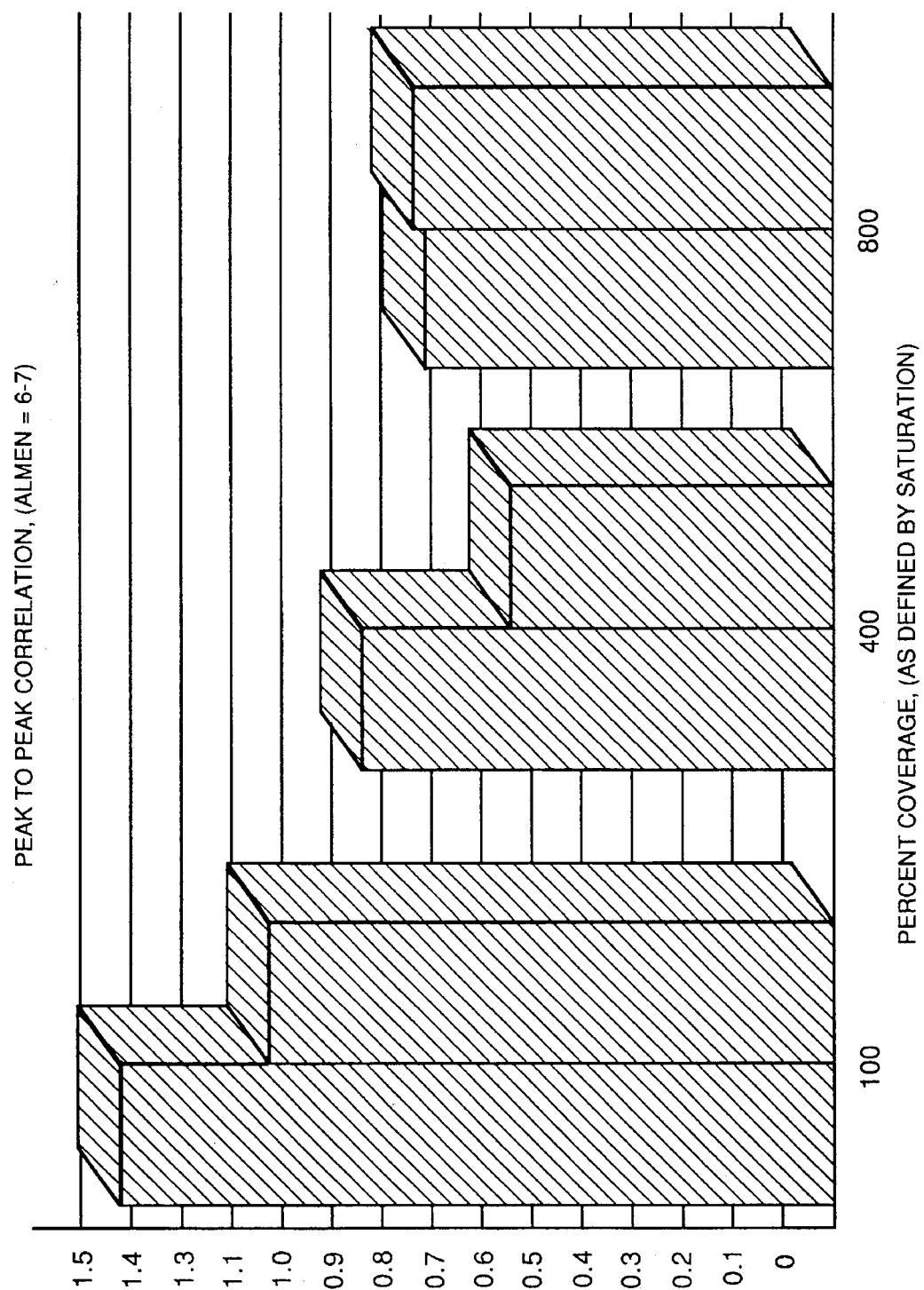
FIG. 6 is a bar graph depicting a peak to peak correlation magnitude for a low intensity shot peened sampling, said sampling ranging from an Almen Intensity of 6.0 to 7.2.
Figure 7:
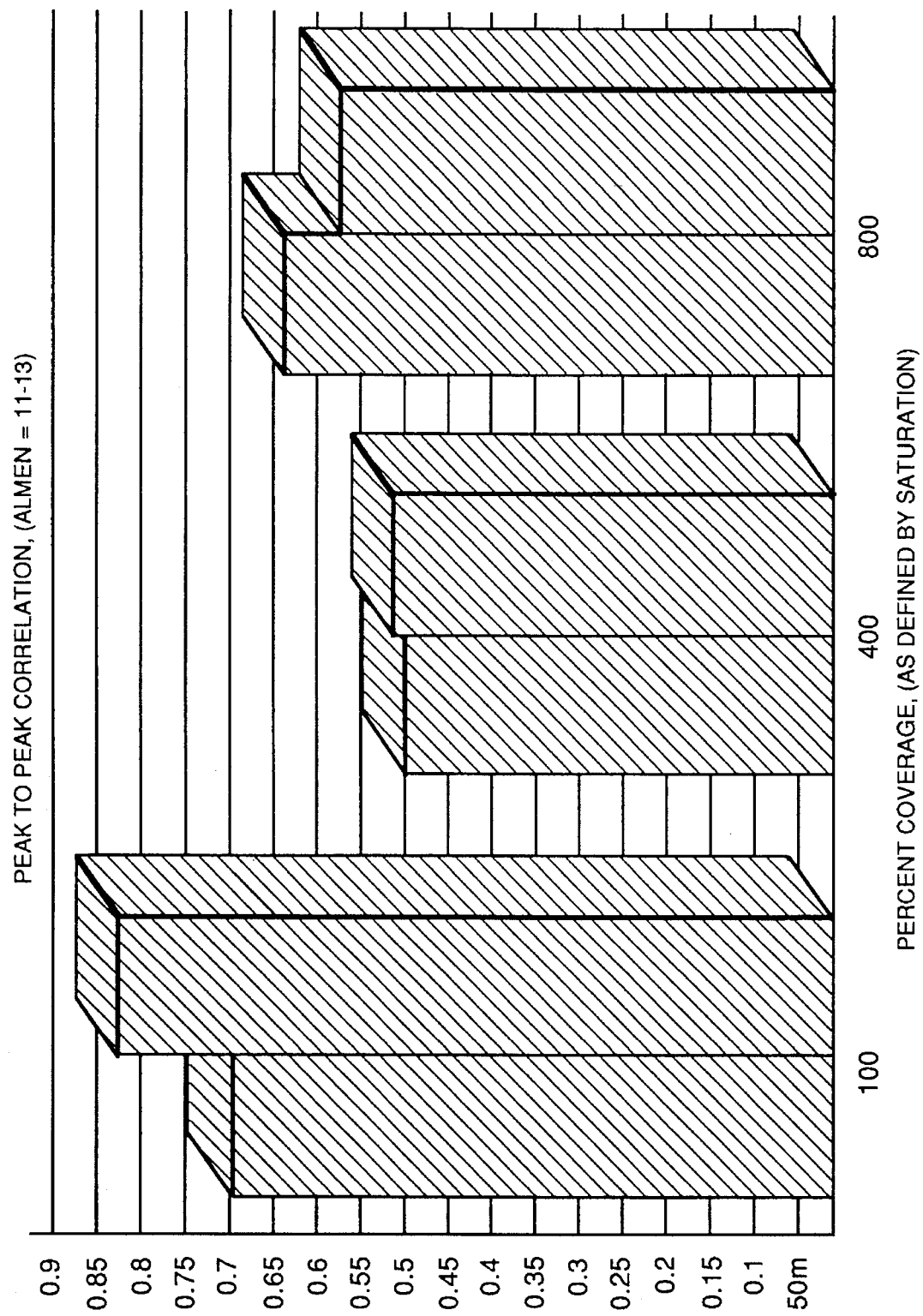
FIG. 7 is a bar graph depicting a peak to peak correlation magnitude for a medium intensity shot peened sampling, said sampling ranging from an Almen Intensity of 11.0 to 13.0.
Figure 8:
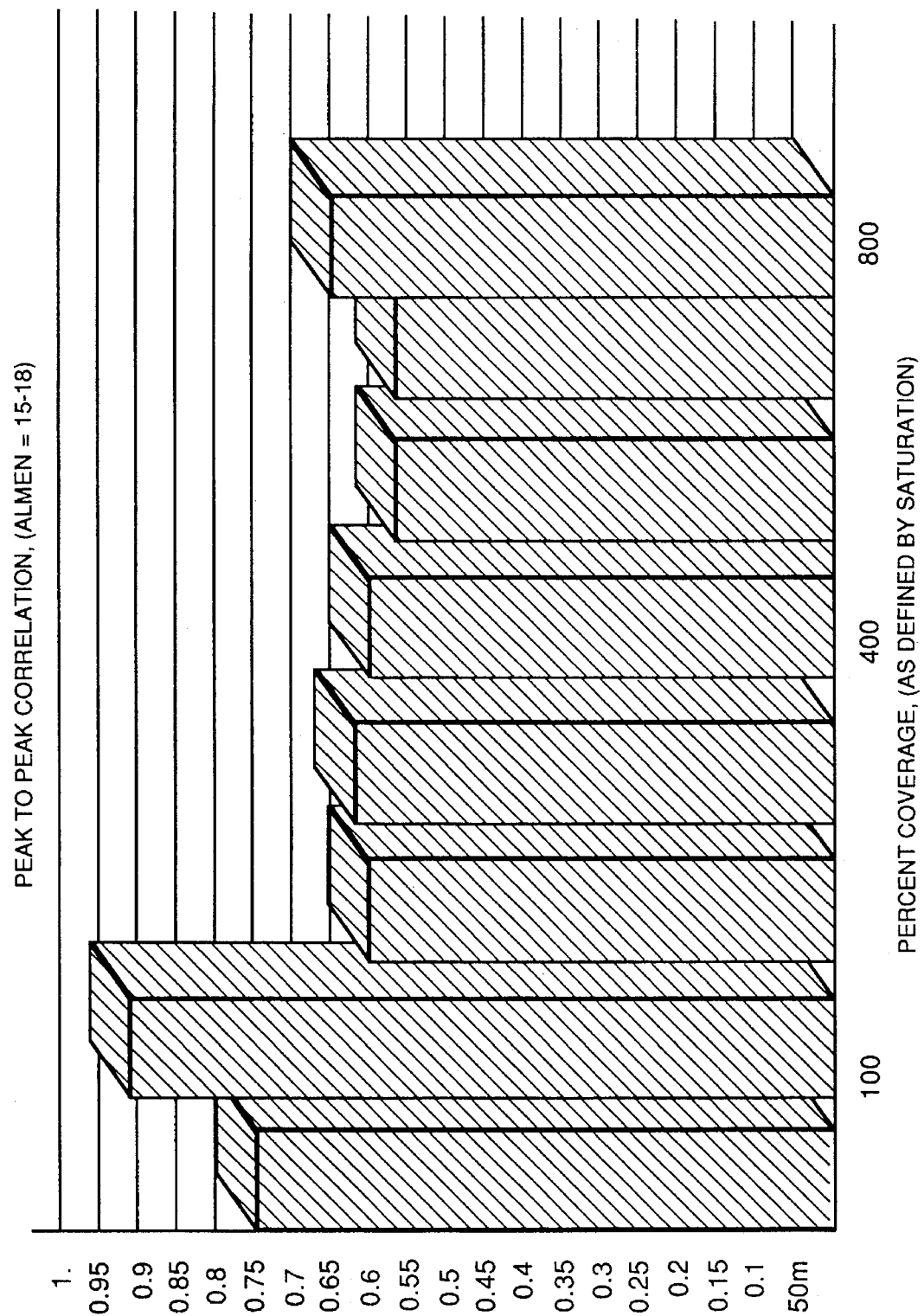
FIG. 8 is a bar graph depicting a peak to peak correlation magnitude for a high intensity shot peened sampling, said sampling ranging from an Almen Intensity of 15.0 to 18.0.

As apparent in FIGS. 6 and 7 samples with 100% coverage show much higher correlation levels than do those at 400% or 800%. Although one may initially expect to observe a greater difference between the 400% and 800% coverage levels, it has been found that at coverage levels above 400% very little additional surface change is affected. Furthermore, higher intensity samples such as those in the 15 A–18 A intensity range have a much lower signal to noise ratio as the high intensity shot peening has already wiped away much of the machining information at the lower coverage's. This effect is made evident in FIG. 8 where only the lowest percent coverage samples stand out from the pack.

The results of the observed correlation analysis are backed by coverage statistics. Statistical evaluation of the shot peeing process predicts the relation between coverage and the number of randomly directed shot strikes. It can be shown that an exponential relation exists between the covered area and the dimple area induced by shot strikes. The relation is:

$$a/A = 1 - e^{-A_i N/A}$$

where:

a=Covered area (in$^2$)

Figure 9:
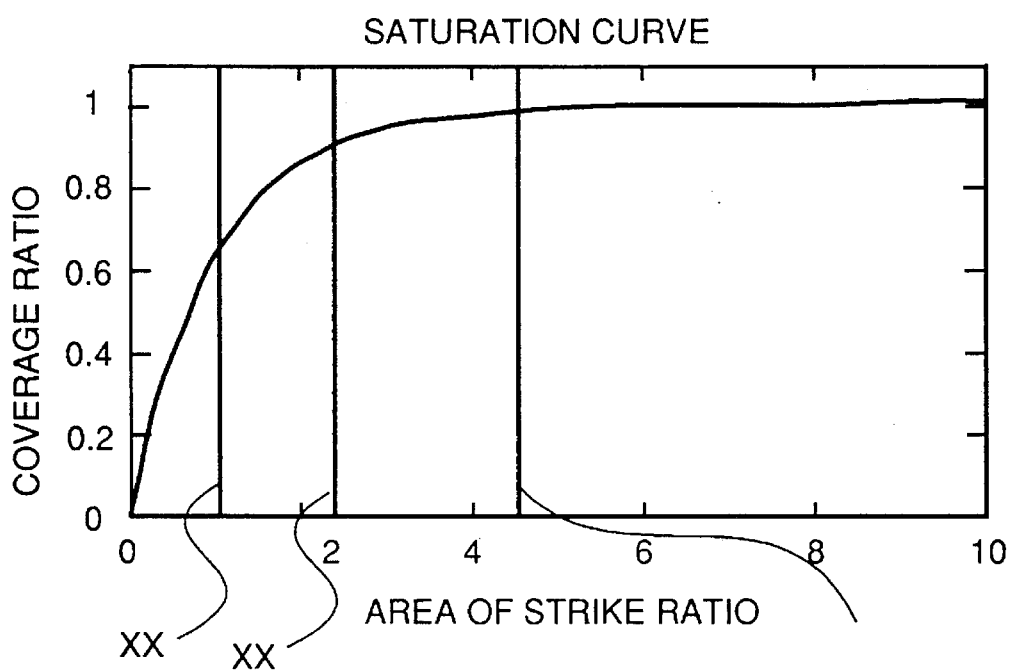
FIG. 9 is a graphical illustration of a plot of the coverage ratio versus the area of strike ratio.

A=Element of area being peened $A_i$=Shot strike dimple area (in$^2$) which depends on shot speed, size density and part yield N=Total number of shot strikes which depends on shot stream particle density distribution and gun trajectory a/A=Coverage ratio $A_i N/A$=Area of strike ratio FIG. 9 is a plot of the coverage ratio versus the area of strike ratio.

As is apparent from FIG. 9, there is little difference in the apparent level of peening between 100% and 200% coverage, and at levels above 200% the curve flattens out rapidly. This effect shows up in the correlation data as well with little resolution between 400% and 800%.

The foregoing has described several embodiments of an apparatus to measure particle distribution of a shot stream. While specific embodiments of the present invention have been described, it will be apparent to those skilled in the art that various modifications thereto can be made without departing from the spirit and scope of the invention as defined in the appended claims.

What is claimed is:

1. A method for measuring shot peening coverage using a correlation analysis of surface line data, said method comprising the steps of:

selecting an area of shot peened surface treatment to analyze;

obtaining at least two approximately parallel profile line traces from the surface treatment area to provide respective first and second data vectors thereof;

determining the correlation function $R_{xy}^j$ for said two data vectors according to the equation $$R_{xy}^j = \frac{1}{\alpha_1 \alpha_2 (N-j)} \sum_{i=1}^{N-j} [(x_{1-\eta_1}^i)(x_{2-\eta_2}^{i+j-1})]$$

where $x_1$ is said first data vector; $x_2$ is said second data vector; N is the number of points in each vector; j ranges from 0 to N/3; $\alpha_1$ and $\alpha_2$ represent standard deviation of said data vectors calculated using the following equations:

$$\alpha_1 \frac{1}{N} \sqrt{\sum_{i=1}^{N} (x_1 - \eta_1)^2}$$

$$\alpha_1 \frac{1}{N} \sqrt{\sum_{i=1}^{N} (x_2 - \eta_2)^2}$$

$\eta_1$ and $\eta_2$ represent mean values of said data vectors calculated using the following formulas:

$$\eta_1 = \frac{1}{N} \sum_{i=1}^{N} x_1; \text{ and}$$

$$\eta_1 = \frac{1}{N} \sum_{i=1}^{N} x_1$$

finding the maximum peak to peak value of the correlation function for indicating said shot peening coverage.

2. A method in accordance with claim 1, wherein said step of obtaining profile line traces is completed using a profilometer.

3. A method in accordance with claim 1, wherein said surface treatment area includes machining marks, and said step of obtaining profile line traces is completed at a 30° angle to said marks.

4. A method in accordance with claim 1, wherein said surface treatment area includes machining marks, and said step of obtaining profile line traces is completed using a profilometer positioned at a 30° angle to said marks.

5. A method for measuring shot peening coverage comprising:

shot peening a workpiece having machining marks thereon;

tracing said workpiece along a plurality of spaced apart lines to obtain a respective plurality of data vectors indicative of vertical displacement profiles thereof;

cross correlating said plurality of data vectors to determine relative closeness between said data vectors as a function of distance between individual data points in said vectors; and determining a maximum peak to peak value of said cross correlation indicative of said shot peening coverage.

6. A method according to claim 5 wherein said tracing lines are substantially parallel to each other.

7. A method according to claim 6 wherein said tracing lines are disposed at an acute angle relative to said marks.

8. A method according to claim 7 wherein said acute angle is about 30°.

9. A method according to claim 7 wherein said shot peening effects craters on said workpiece, and said tracing lines are spaced apart from each other no less than twice the diameter of a largest one of said craters.

10. A method according to claim 7 wherein said cross correlating step is based on standard deviations and mean values of said data vectors.

11. A method according to claim 10 further comprising normalizing said cross correlation to a range between positive and negative one, with positive one representing full correlation, negative one representing negative correlation, and zero representing random correlation.

12. A method according to claim 7 further comprising two of said spaced apart tracing lines.

\* \* \* \* \*